June 5, 1956     C. KELLER     2,748,599
METHOD AND INSTALLATION FOR OPERATING A WIND TUNNEL, MORE
ESPECIALLY FOR HIGH MACH NUMBERS
Filed Nov. 14, 1952
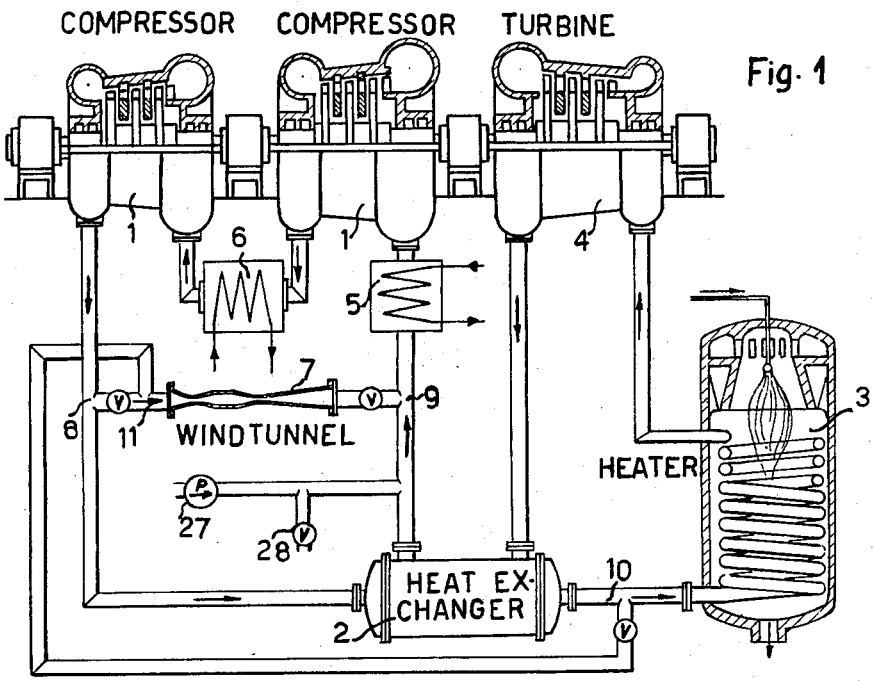
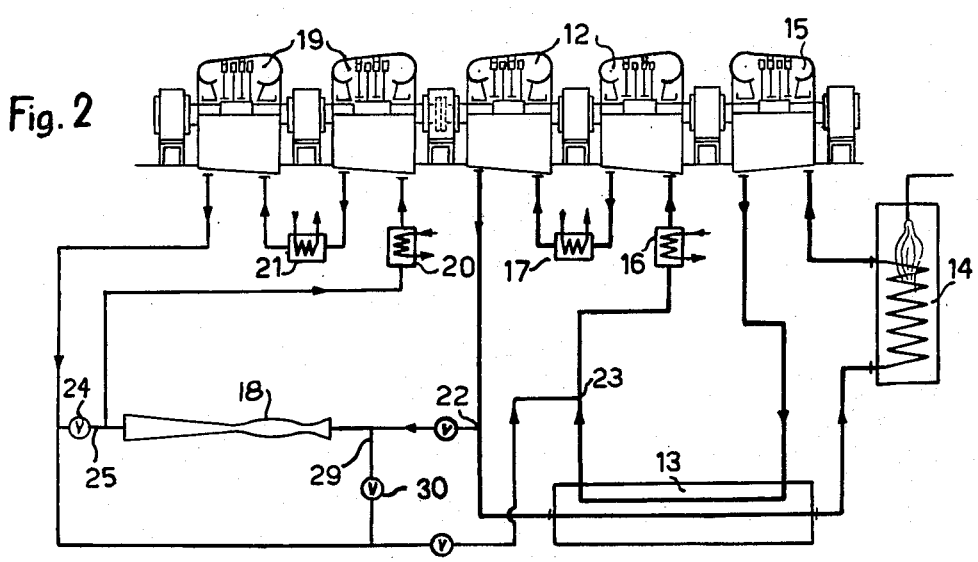
Inventor
Curt Keller
By *Dodge and Sons*
Attorneys

United States Patent Office 2,748,599
Patented June 5, 1956

2,748,599

METHOD AND INSTALLATION FOR OPERATING A WIND TUNNEL, MORE ESPECIALLY FOR HIGH MACH NUMBERS

Curt Keller, Kusnacht, Switzerland, assignor to Aktiengesellschaft fuer Technische Studien, Zurich, Switzerland, a corporation of Switzerland Application November 14, 1952, Serial No. 320,491

Claims priority, application Switzerland November 30, 1951

12 Claims. (Cl. 73—147)

The invention relates to a process for operating a wind tunnel, more especially for high Mach numbers, for which the power required is supplied by a thermal power plant, in which a gaseous working medium describes a circuit through at least one compressor and at least one turbine and heat from outside is supplied to this working medium in at least one heater.

In accordance with the process which is already known, a separate compressor with the number of stages corresponding to the pressure drop to be produced must be provided for the flow medium intended for the circulation in the wind tunnel. In addition, a further compressor is necessary for circulating the operating medium in the circuit of the thermal power installation.

The object of the invention is a method with which it is possible to manage with a minimum of compressor stages for the circulation of the flow medium in the wind tunnel. To this end, in accordance with the process of the invention, the flow medium intended for the circulation in the wind tunnel is taken from the circuit of the thermal power plant at a point which is located after the first stage of compression; furthermore, this flow medium is returned at a point in that circuit at which there prevails a lower pressure than at the point of removal. When employing this method, the compression of the flow medium travelling through the wind tunnel is affected at least in part by the compressor of the thermal power plant. It is consequently possible to operate without a supplementary compressor for the wind tunnel or at the most with such a compressor which has fewer stages than a compressor which is completely independent of the closed cycle of the thermal power plant and in which the total increase in pressure for the circulation of the flow medium in the wind tunnel is to be produced. Thus the invention renders it possible to effect economies as regards expenditure of material and manufacturing costs.

The accompanying drawing shows in simplified form two arrangements by way of example for carrying the method according to the invention into effect, with reference to which drawing the process is also explained by way of example.

In the drawing:

Figure 1 is an arrangement in which the flow medium of the wind tunnel is withdrawn from the closed cycle after the compressor of the thermal power plant and is returned into the closed cycle ahead of this compressor, and, Figure 2 shows an arrangement in which the flow medium flowing through the wind tunnel experiences a supplementary compression before being reintroduced into the cycle of the thermal power plant.

Figure 1 shows firstly a thermal power plant in which a gaseous working medium, preferably air, describes a closed cycle which leads through compressing means 1 consisting of a number of compression stages, a heat exchanger 2, a heater 3, a turbine 4 and a cooler 5 connected on the input side of the compressing means 1, an intermediate cooler associated with the compressing means 1 is indicated at 6.

Figure 1 also shows a wind tunnel 7 which is connected at the point 8 to the circuit of the thermal power plant. Considered in the direction of flow of the working medium of this installation, the point 8 is disposed after the compressing means 1, so that at this point, in practice, there prevails the maximum pressure occurring in the circuit. The flow medium intended for circulation in the wind tunnel 7 is thus taken from the said circuit and is returned to the latter at point 9 after flowing through the said tunnel 7. The point 9 is located in front of the compressing means 1; as a consequence, the pressure prevailing at this point is in practice the lowest pressure occurring in the circuit of the thermal power plant.

The arrangement which has been described provides on the one hand the advantage that a separate compressor for the delivery of the flow medium for the wind tunnel 7 is not required but it is only necessary to make the compressing means 1 of the thermal power plant of somewhat larger dimensions in order to be able to deliver the additional working medium. This renders it possible to effect the economies set out in the introduction. Such a compressor, which has to deliver a substantially larger quantity of working medium than two parallel-connected compressors in which altogether the same quantity of gas is to be compressed, then operates with better efficiency. These advantages are of particular importance when the wind tunnel is to be designed for high Mach numbers, since in such a case the compression of the flow medium intended for circulation in the wind tunnel would require many stages of compression in a separate compressor.

In order not to reach too low temperatures with the expansion of the flow medium in the wind tunnel, it may in certain cases be desirable to have a higher temperature of this flow medium at the inlet to the wind tunnel than the temperature of the working medium after the compressing means 1. In such a case, it is expedient to withdraw the flow medium intended for circulation in the wind tunnel at a point of the circuit of the thermal power plant at which the compressed working medium has a comparatively high temperature, for example, between the heat exchanger 2 and the heater 3, as indicated in Figure 1 by the conduit leading from point 10 of the circuit to the point 11.

If the wind tunnel is to be operated with very high Mach numbers, for example 4 to 5, so that a pressure ratio of 10 to 20 may be necessary in the compressor of the thermal power plant, it may be desirable to operate with single or multiple intermediate heating in the thermal power plant supplying the power requirements of the wind tunnel. At the highest pressure ratios, it is however expedient, in order to avoid complications in the thermal power plant caused by the intermediate heating, to operate the said installation not with the full pressure ratio necessary for the wind tunnel, but additionally to compress the flow medium withdrawn for operating the wind tunnel by means of supplementary compressing means. Such supplementary compressing means may in principle be connected at the point at which the flow medium intended for circulation in the wind tunnel is withdrawn from the circuit of the thermal power plant, and it may compress this flow medium above the maximum pressure of the circuit, or the supplementary compressing means can compress the flow medium after traversing the wind tunnel from a pressure which is lower than the lowest pressure existing in the circuit of the thermal power plant up to the intake pressure of the compressor of this installation. This second solution is to be preferred to the first solution, since the quantity of gas to be taken from the circuit of the thermal power plant for use in the wind tunnel amounts to only a part of the quantity of working medium circulating in this circuit. A supplementary compressor connected to the outlet pressure of the compressor of the thermal power plant would thus be relatively small and would expediently have to run at a substantially higher speed in order not to contain too many stages. On the contrary, if the flow medium intended for circulation in the wind tunnel is compressed, after traversing the latter, in a supplementary compressor up to a pressure which is substantially equal to or at the most only slightly higher than the lowest pressure prevailing in the circuit of the thermal power plant, the intake pressure of this supplementary compressor is substantially smaller than in the first case, so that despite the smaller quantity by weight than that which flows through the compressor of the thermal power plant, the flow volume can still reach approximately the same value and the supplementary compressor can consequently be given substantially the same size as the compressor of the thermal power plant and can be operated at substantially the same speed. The supplementary compressor expediently also obtains its power requirements from the thermal power plant.

Figure 2 shows a thermal power plant, the circuit of which passes through compressing means 12, a heat exchanger 13, a heater 14, a turbine 15, and a cooler 16 connected on the input side of the compressing means 12. 17 is an intercooler. 18 indicates a wind tunnel, the flow medium intended for the circulation therein being taken from the said circuit, and 19 represents supplementary compressing means of the type herein before mentioned, on the input side of which is connected a cooler 20. 21 indicates an intermediate cooler associated with the supplementary compressing means 19.

The flow medium intended for the wind tunnel 18 is taken from the circuit of the thermal power plant at the point 22 after compression in the compressing means 12. With the flow through the wind tunnel 18, owing to the flow losses and especially owing to the shocks at the diffuser, at a supposed high Mach number, there only prevails at the outlet a pressure which is substantially smaller than the output pressure and even lower than the intake pressure of the compressing means 12 of the thermal power plant. The compression of the flow medium after leaving the wind tunnel up to the pressure which prevails at the point 23 of the circuit of the working medium in the thermal power plant, at which point that flow medium is returned into this working medium circuit, is effected by the supplementary compressing means 19, which obtains its power requirements from the thermal power plant. The flow quantities in the working medium circuit of the thermal power installation and the quantity of flow medium intended for the wind tunnel must naturally be so adapted to one another that the excess power which remains when the power consumed by the compressing means 12 is deducted from the power supplied by the turbine 15 is still sufficient for driving the supplementary compressing means 19.

Changes in the compression ratio which is produced and thus also in the Mach numbers obtained in the wind tunnel are also capable of being obtained within certain limits by varying the speed of the machines in the thermal power installation. It may however be desirable to be able to vary the Mach number to a relatively large degree. Starting from an arrangement according to Figure 2, the Mach number may for example be reduced by the wind tunnel 18 being used without supplementary compressing means 19, as is the case in Figure 1. This means that in the arrangement according to Figure 2, there must also be provided means which permit the supplementary compressing means which is capable of being disconnected to be selectively taken out of the circuit of the flow medium intended for circulation in the wind tunnel. To this end, there is provided a by-pass conduit 25 with built-in valve 24 which is shown in Figure 2 and which enables the supplementary compressing means 19 to be by-passed.

In arrangements which comprise a thermal power plant and a wind tunnel in the manner described, the density of the working medium contained in the circuit of the thermal power plant can be varied by the provision of additional means, for example, an air pump 27 (Figure 1) and a discharge valve 28, the density of the flow medium in the wind tunnel then being varied in the same ratio. It is thus possible, with a fixed Mach number, to operate the wind tunnel with different Reynolds numbers.

Arrangements of the nature described are expediently operated with air since this working medium is readily available in any required quantity. However, it is in principle also possible to use other gases for operating the arrangement, for example carbon dioxide or argon. The use of a gas with a higher molecular weight than the mean molecular weight of air has the advantage that the compression ratio necessary for obtaining a high Mach number in the wind tunnel can be obtained with a smaller number of stages of the turbo-machines.

The flow medium intended for circulation in the wind tunnel can in principle be taken from the circuit of the thermal power plant at any point which is after the first compression stage and before the inlet to the turbine. For example, the flow medium for the wind tunnel can also be withdrawn from the circuit of the thermal power plant only after at least partial heating has taken place. Moreover, the said flow medium can in principle be returned to the said circuit at any point at which there prevails a lower pressure than at the point where it was withdrawn.

In principle, the process according to the invention can be used for operating wind tunnels for any desired Mach numbers.

The heat to be supplied from outside to the working medium in the heater can be delivered from any heating source. For example, this heat may be derived from the combustion of a fuel in the heater itself or from a source of heat disposed externally of the heater.

In order to be able to visualize the conditions such as exist when the process according to the invention is put to practical use, it is to be mentioned that for producing a Mach number of 5 in a wind tunnel with a measuring cross-section of about 0.1 m.$^2$, the air in the compressor of the thermal power plant is to be compressed to 50 atm. abs., then heated in the tubes of the heater, fired for example with oil or gas, to approximately 650° C. and then expanded in the turbine to 12 atm. abs. The air extracted from the circuit of the thermal power plant at a pressure of 50 atm. abs. is expanded in the wind tunnel to about 0.1 atm. abs. and compressed at the end of the diffuser by recovery to about 2.7 atm. abs. again. The velocity in the measuring one of the tunnel is about 5 times the velocity of sound. In a supplementary compressor of the type shown in Figure 2, the air flowing through the wind tunnel is compressed to the pressure prevailing at the entrance to the compressor of the thermal power plant, that is to say, to 12 atm. abs. For operating this wind tunnel, the thermal power installation supplies 12,500 kw.

By employing the process in accordance with the invention, it is possible, as compared with the known state of the art, to produce an important saving in fuel, since firstly the energy necessary for operating the wind tunnel is smaller and secondly because thermal power plants in which a gaseous working medium describes a circuit permit in themselves a high efficiency to be obtained. In addition, owing to the possibility of varying the pressure level in the circuit, such thermal power plants still operate with good efficiency even at partial loads.

It is thus possible to operate with few machines when using the process according to the invention, this being accompanied by a reduction of bearing and leakage losses. The machines to be provided, even for the said output of 12,500 kw., which is required for the operation of the wind tunnel, are still capable of being given comparatively small dimensions, and the largest diameter of the six-stage turbine running at 7,000 R. P. M. is only about 700 mm. and the maximum diameter of the compressor of radial construction (circulation compressor and supplementary compressor), of which one has a common shaft with the turbine, is only 840 mm. If it should seem expedient, the turbine and the compressor of the thermal power installation are capable of being arranged in a common housing, as these machines are capable of being given a very compact construction even for relatively large measuring cross-sections of the wind tunnel without it being necessary to resort to special constructions.

Finally, it is to be mentioned that the range of use of an arrangement according to Figure 2 is capable of being enlarged within the range of the smaller Mach numbers by the fact that a shut-off valve is incorporated in the conduit connecting the point 22 with the wind tunnel 18 and in the conduit connecting the supplementary compressing means 19 with the point 23 and the said two connecting conduits are connected by a by-pass conduit 29 provided with a shut-off valve 30. If the latter valve is opened, and the first-mentioned two shut-off valves are closed, then the flow medium supplied by the supplementary compressor passes directly into the inlet pipe of the wind tunnel, so that the flow medium intended for the wind tunnel describes a circuit which is independent of the circuit of the thermal power plant. This flow medium is then only still delivered by the supplementary compressor.

What is claimed is:

1. That method of circulating gas through a wind tunnel which consists in continuously circulating a gaseous working medium in a quantity exceeding the flow capacity of the wind tunnel in a closed path, compressing said working medium from a pressure above atmosphere to an even higher pressure, allowing a quantity of the so-compressed working medium equal to the flow capacity of the wind tunnel to traverse the wind tunnel, supplying heat from an external source to the quantity of working medium in excess of that allowed to traverse the wind tunnel, causing the medium thus heated to expand while doing external work, cooling the so-expanded medium, and recompressing the medium which has traversed the wind tunnel together with the said expanded medium, while applying at least a portion of the external work done by the medium caused to expand for recompressing the circulating working medium.

2. The method defined in claim 1, in which the compressed working medium is heated by the medium which has been caused to expand, before the quantity of the compressed working medium which is equal to the flow capacity of the wind tunnel, is allowed to traverse the wind tunnel.

3. The method defined in claim 1, in which the medium which has traversed the wind tunnel, is additionally compressed before it is recompressed together with the medium to which heat has been supplied from the external source, and which has been caused to expand.

4. The method defined in claim 1, in which the medium which has traversed the wind tunnel, is additionally compressed before it is recompressed together with the medium to which heat has been supplied from the external source, and which has been caused to expand, and in which method at least a portion of the external work done by the medium caused to expand is applied for additionally compressing the medium which has traversed the wind tunnel.

5. The combination of a wind tunnel; a thermal power plant in which a gaseous working medium describes a closed circuit comprising compressing means consisting of at least one compression stage, in which the working medium is compressed from a pressure above atmospheric to an even higher pressure, at least one heater in which heat is supplied from outside to the so-compressed working medium, at least one turbine in which the heated working medium is allowed to expand, at least one cooler in which heat is withdrawn from the so-expanded working medium, and connections whereby said turbine drives said compressing means; pipe means connecting the inlet of said wind tunnel with a point of the circuit situated between the exit of the first compression stage and the inlet of the turbine; and pipe means connecting the outlet of the wind tunnel with a point of the circuit in which a lower pressure prevails than that prevailing at said point of the circuit situated between the exit of the first compression stage and the inlet of the turbine, a part of the working medium thus being allowed to circulate through the wind tunnel.

6. The combination defined in claim 5 in which the point of the circuit connected with the inlet of the wind tunnel is situated after the last compression stage.

7. The combination of a wind tunnel; a thermal power plant in which a gaseous working medium describes a closed circuit comprising compressing means in which the working medium is compressed, at least one heater in which heat is supplied from outside to the so-compressed working medium, at least one turbine in which the heated working medium is allowed to expand, a heat exchanger in which the expanded working medium gives up heat to the compressed working medium, at least one cooler in which heat is withdrawn from the expanded working medium, and connections whereby said turbine drives said compressing means; pipe means connecting the inlet of said wind tunnel with a point of the circuit containing compressed working medium and situated between the heat exchanger and the heater; and pipe means connecting the outlet of the wind tunnel with a point of the circuit situated between the heat exchanger and the inlet of the compressing means, thus allowing a part of the compressed working medium after being heated in the heat exchanger to expand in the wind tunnel and to be returned to the expanded working medium of the circuit.

8. The combination of a wind tunnel; a thermal power plant in which a gaseous working medium describes a closed circuit comprising compressing means in which the working medium is compressed, at least one heater in which heat is supplied from outside to the so-compressed working medium, at least one turbine in which the heated working medium is allowed to expand, at least one cooler in which heat is withdrawn from the so-expanded working medium, and connections whereby said turbine drives said compressing means; pipe means connecting the inlet of said wind tunnel with a point of the circuit which contains compressed working medium, and thus allowing a part of said compressed working medium to expand in the wind tunnel; supplementary compressing means for partially recompressing the so-expanded part of the working medium; and pipe means connecting the outlet of said supplementary compressing means with a point of the circuit which contains expanded working medium and delivering said expanded and partially recompressed part of the working medium to the circuit of the thermal power plant.

9. The combination defined in claim 8 in which connections are provided whereby said turbine drives also said supplementary compressing means.

10. The combination of a wind tunnel capable of being adjusted so as to operate with different Mach numbers; a thermal power plant in which a gaseous working medium describes a closed circuit comprising compressing means in which the working medium is compressed, at least one heater in which heat is supplied from outside to the so-compressed working medium, at least one turbine in which the heated working medium is allowed to expand, at least one cooler in which heat is withdrawn from the so-expanded working medium, and connections whereby said turbine drives said compressing means; pipe means connecting the inlet of said wind tunnel with a point of the circuit which contains compressed working medium, and thus allowing a part of said compressed working medium to expand in the wind tunnel; supplementary compressing means for partially recompressing the so-expanded part of the working medium; disconnectable coupling means for delivering power from the turbine of the thermal power plant to said supplementary compressing means; pipe means connecting the outlet of the wind tunnel with the inlet of said supplementary compressing means; pipe means connecting the outlet of said supplementary compressing means with a point of the circuit which contains expanded working medium and capable of delivering said expanded and partially recompressed part of the working medium to the circuit of the thermal power plant; a by-pass conduit by-passing said supplementary compressing means and capable of being shut-off, said by-pass conduit in opened condition allowing the wind tunnel to be operated without additionally recompressing the said part of the working medium flowing through the wind tunnel.

11. The combination defined in claim 10 comprising a second by-pass conduit capable of being shut-off and connecting the inlet of the wind tunnel with the outlet of the supplementary compressing means; and valves inserted in the pipe means connecting the inlet of the wind tunnel with said point of the circuit which contains compressed working medium and also in the pipe means connecting the outlet of the supplementary compressing means with said point of the circuit which contains expanded working medium capable of disconnecting the wind tunnel from the circuit of the thermal power plant and allowing the wind tunnel also to be operated with flow medium only being delivered by the supplementary compressing means.

12. The combination defined in claim 5 comprising means for supplying working medium to the circuit of the thermal power plant and for withdrawing working medium therefrom and thus varying the density of the working medium contained in the circuit of the thermal power plant and in the wind tunnel.

References Cited in the file of this patent

UNITED STATES PATENTS

| | | |
|---|---|---|
| 2,164,000 | Keller | June 27, 1939 |
| 2,495,604 | Salzmann | Jan. 24, 1950 |
| 2,551,470 | Smith | May 1, 1951 |
| 2,592,322 | Nerad | Apr. 8, 1952 |

FOREIGN PATENTS

| | | |
|---|---|---|
| 521,143 | Great Britain | May 14, 1940 |

OTHER REFERENCES

Publication by V. I. Stevens: "Hypersonic Research Facilities at the Ames Aeronautical Lab." Journal of Applied Physics, November 1950, pages 1150–1155.